US009777971B2

(12) United States Patent
Nagurny et al.

(10) Patent No.: US 9,777,971 B2
(45) Date of Patent: Oct. 3, 2017

(54) MODULAR HEAT EXCHANGER

(75) Inventors: Nicholas J. Nagurny, Manassas, VA (US); Eugene Jansen, Dumfries, VA (US); Doug Hillson, Manassas, VA (US); Michael R. Eller, New Orleans, LA (US)

(73) Assignee: Lockheed Martin Corporation, Bethesda, MD (US)

( * ) Notice: Subject to any disclaimer, the term of this patent is extended or adjusted under 35 U.S.C. 154(b) by 437 days.

(21) Appl. No.: 12/573,982

(22) Filed: Oct. 6, 2009

(65) Prior Publication Data
US 2011/0079375 A1 Apr. 7, 2011

(51) Int. Cl.
F28F 7/00 (2006.01)
F28F 3/08 (2006.01)
F28D 1/02 (2006.01)
F03G 7/05 (2006.01)
(Continued)

(52) U.S. Cl.
CPC ............. F28F 3/083 (2013.01); F03G 7/05 (2013.01); F28D 1/022 (2013.01); F28D 9/0031 (2013.01); F28D 9/0062 (2013.01); F28F 3/10 (2013.01); Y02E 10/34 (2013.01); Y10T 29/4935 (2015.01); Y10T 29/49826 (2015.01)

(58) Field of Classification Search
CPC .. F28F 3/083; F28F 3/10; F28D 1/022; F28D 9/0062; F28D 9/0031; Y02E 10/34; F03G 7/05
USPC ........ 165/76, 78–79, 164–166, 80.4, 104.11, 165/104.13, 104.19
See application file for complete search history.

(56) References Cited

U.S. PATENT DOCUMENTS

| 1,622,664 A | 3/1927 | Murray et al. |
| 2,040,947 A | 5/1936 | Mojonnier et al. |
| 2,071,277 A | 2/1937 | Barclay et al. |

(Continued)

FOREIGN PATENT DOCUMENTS

| CN | 1333868 A | 1/2002 |
| CN | 2821508 Y | 9/2006 |

(Continued)

OTHER PUBLICATIONS

Yang et al., "Forced Heat Convection of Wavy Fin Channel", "Journal of Thermal Science and Technology", 2008, pp. 342-354, vol. 3, No. 2.

(Continued)

*Primary Examiner* — Grant Moubry
*Assistant Examiner* — Jon T Schermerhorn
(74) *Attorney, Agent, or Firm* — Withrow & Terranova, PLLC (57) ABSTRACT

A heat exchanger comprising a plurality of plates that are demountably attached to a frame is disclosed. Each plate comprises a plurality of channels for conveying a primary fluid through the heat exchanger. The frames are arranged in the frame so that spaces between adjacent frame pairs define conduits for conveying a secondary fluid through the heat exchanger. The plates are mounted in the frame so that they can be individually removed from the frame. Further, each of the channels is fluidically connected to input and output ports for the primary fluid by detachable couplings. As a result, heat exchangers in accordance with the present invention are more easily repaired or refurbished than prior-art heat exchangers.

8 Claims, 7 Drawing Sheets

(51) Int. Cl.
F28D 9/00 (2006.01)
F28F 3/10 (2006.01)

(56) References Cited

U.S. PATENT DOCUMENTS

| | | | |
|---|---|---|---|
| 2,083,028 A | 6/1937 | Livar | |
| 2,184,759 A | 12/1939 | Shipman | |
| 2,229,554 A | 1/1941 | Cummings | |
| 2,347,957 A | 5/1944 | McCullough | |
| 2,424,265 A | 7/1947 | Allen | |
| 2,540,339 A | 2/1951 | Kritzer | |
| 2,653,211 A | 9/1953 | Andrus | |
| 2,938,712 A | 5/1960 | Pellmyr | |
| 2,995,343 A | 8/1961 | Gardner et al. | |
| 3,294,162 A | 12/1966 | Loehlein et al. | |
| 3,460,611 A | 8/1969 | Folsom et al. | |
| 3,476,179 A | 11/1969 | Meister et al. | |
| 3,595,310 A | 7/1971 | Burne et al. | |
| 3,761,384 A | 9/1973 | Ruthel et al. | |
| 3,805,515 A | 4/1974 | Zener | |
| 3,807,494 A | 4/1974 | Ris | |
| 3,825,061 A | 7/1974 | Bathla | |
| 3,881,547 A | 5/1975 | Lavering | |
| 4,055,145 A * | 10/1977 | Mager et al. | 119/212 |
| 4,095,646 A | 6/1978 | Granetzke | |
| 4,098,329 A | 7/1978 | Culver | |
| 4,099,928 A | 7/1978 | Norback | |
| 4,103,647 A | 8/1978 | Dörling et al. | |
| 4,149,591 A | 4/1979 | Albertsen | |
| 4,150,719 A | 4/1979 | Thielen et al. | |
| 4,253,516 A | 3/1981 | Giardina | |
| 4,276,927 A | 7/1981 | Foust | |
| 4,294,564 A | 10/1981 | Person et al. | |
| 4,323,114 A | 4/1982 | Corey | |
| 4,350,014 A | 9/1982 | Sanchez et al. | |
| 4,355,684 A | 10/1982 | Caines | |
| 4,401,155 A | 8/1983 | Royal et al. | |
| 4,432,307 A | 2/1984 | Godin | |
| 4,478,277 A | 10/1984 | Friedman et al. | |
| 4,592,416 A | 6/1986 | Mattison et al. | |
| 4,625,794 A | 12/1986 | Dürst | |
| 4,633,819 A | 1/1987 | Tilliette | |
| 4,688,631 A | 8/1987 | Peze et al. | |
| 4,693,304 A | 9/1987 | Volland | |
| 4,729,427 A | 3/1988 | Baumann | |
| 4,729,428 A | 3/1988 | Yasutake et al. | |
| 4,738,309 A * | 4/1988 | Schilling | 165/144 |
| 4,753,773 A | 6/1988 | Garabedian et al. | |
| 4,782,571 A | 11/1988 | Krips et al. | |
| 4,941,530 A | 7/1990 | Crowe | |
| 5,042,572 A | 8/1991 | Dierbeck | |
| 5,137,080 A | 8/1992 | Haasch et al. | |
| 5,178,822 A | 1/1993 | Buford, III et al. | |
| 5,285,843 A | 2/1994 | Dierbeck | |
| 5,289,870 A | 3/1994 | Dierbeck | |
| 5,303,770 A | 4/1994 | Dierbeck | |
| 5,448,830 A | 9/1995 | Borchert et al. | |
| 5,452,758 A * | 9/1995 | Mauterer | 165/145 |
| 5,499,674 A | 3/1996 | Bartz et al. | |
| 5,513,700 A | 5/1996 | Kleve et al. | |
| 5,566,881 A | 10/1996 | Inoue et al. | |
| 5,590,707 A | 1/1997 | Mauterer | |
| 5,655,600 A | 8/1997 | Dewar et al. | |
| 5,775,412 A | 7/1998 | Montestruc, III et al. | |
| 5,813,592 A | 9/1998 | Midling et al. | |
| 5,988,266 A * | 11/1999 | Smith et al. | 165/78 |
| 6,009,938 A | 1/2000 | Smith et al. | |
| 6,035,928 A | 3/2000 | Ruppel et al. | |
| 6,059,026 A | 5/2000 | Bailly et al. | |
| 6,106,789 A | 8/2000 | Thompson et al. | |
| 6,173,493 B1 | 1/2001 | Dierbeck | |
| 6,390,185 B1 | 5/2002 | Proeschel | |
| 6,637,109 B2 | 10/2003 | Nyqvist | |
| 6,808,689 B1 | 10/2004 | Matsumoto et al. | |
| 6,819,561 B2 | 11/2004 | Hartzell et al. | |
| 6,901,660 B2 | 6/2005 | Miska | |
| 6,945,322 B2 | 9/2005 | Ikeda | |
| 6,983,788 B2 | 1/2006 | Haglid | |
| 7,055,576 B2 | 6/2006 | Fernstrum | |
| 7,165,605 B2 | 1/2007 | Park et al. | |
| 7,191,824 B2 | 3/2007 | Wu et al. | |
| 7,328,578 B1 | 2/2008 | Saucedo | |
| 7,549,466 B2 | 6/2009 | Hayashi et al. | |
| 7,726,388 B2 | 6/2010 | Toda | |
| 7,921,558 B2 | 4/2011 | Beamer et al. | |
| 7,926,558 B2 | 4/2011 | Hagberg | |
| 7,967,060 B2 | 6/2011 | Trumbower et al. | |
| 8,540,012 B2 | 9/2013 | Nagurny et al. | |
| 2002/0038702 A1 | 4/2002 | Font-Freide et al. | |
| 2002/0153130 A1 | 10/2002 | Okamoto et al. | |
| 2002/0162651 A1 | 11/2002 | Nakagome et al. | |
| 2005/0061485 A1 | 3/2005 | Hirafuji et al. | |
| 2005/0103482 A1 | 5/2005 | Park et al. | |
| 2005/0133567 A1 | 6/2005 | Runyan | |
| 2005/0173103 A1 * | 8/2005 | Dawson | 165/166 |
| 2006/0175051 A1 | 8/2006 | Kinoshita | |
| 2007/0029070 A1 | 2/2007 | Yamamoto et al. | |
| 2007/0131399 A1 | 6/2007 | Digele | |
| 2007/0138237 A1 | 6/2007 | Nishikawa et al. | |
| 2007/0284095 A1 | 12/2007 | Wang et al. | |
| 2008/0029254 A1 | 2/2008 | Sekito et al. | |
| 2008/0078536 A1 | 4/2008 | Tolani | |
| 2008/0135219 A1 | 6/2008 | Doh et al. | |
| 2008/0241615 A1 | 10/2008 | Sugimasa et al. | |
| 2009/0008066 A1 | 1/2009 | Meng et al. | |
| 2009/0065178 A1 * | 3/2009 | Kasezawa et al. | 165/104.19 |
| 2009/0140428 A1 | 6/2009 | Bonilla et al. | |
| 2009/0159643 A1 | 6/2009 | Wimmer et al. | |
| 2009/0229804 A1 * | 9/2009 | Zebuhr | 165/166 |
| 2009/0294110 A1 | 12/2009 | Foust | |
| 2009/0308582 A1 | 12/2009 | Nagurny et al. | |
| 2011/0079375 A1 | 4/2011 | Nagurny et al. | |
| 2011/0120126 A1 | 5/2011 | Srinivasan | |
| 2011/0173978 A1 | 7/2011 | Rekret et al. | |
| 2012/0011849 A1 | 1/2012 | Cole et al. | |
| 2012/0073291 A1 | 3/2012 | Shapiro et al. | |
| 2012/0199331 A1 | 8/2012 | Maurer et al. | |
| 2013/0042612 A1 | 2/2013 | Shapiro et al. | |
| 2013/0042613 A1 | 2/2013 | Ross et al. | |
| 2013/0042996 A1 | 2/2013 | Hwang et al. | |

FOREIGN PATENT DOCUMENTS

| | | |
|---|---|---|
| CN | 203443419 U | 2/2014 |
| DE | 2351529 A1 | 4/1975 |
| DE | 19624937 A1 | 1/1998 |
| DE | 102005058314 A1 | 6/2007 |
| DE | 102007021420 A1 | 11/2008 |
| EP | 0174554 A1 | 3/1986 |
| EP | 1033546 A2 | 9/2000 |
| EP | 2072938 A2 | 6/2009 |
| FR | 1374955 A | 10/1964 |
| FR | 1559076 A | 3/1969 |
| FR | 2510729 A1 | 2/1983 |
| GB | 969319 | 9/1964 |
| GB | 2424265 A | 9/2006 |
| JP | S5420690 B2 | 7/1979 |
| JP | 57018473 A | 1/1982 |
| JP | S6131889 A | 2/1986 |
| JP | S61213493 A | 9/1986 |
| JP | S6288169 U | 6/1987 |
| JP | 62158996 A | 7/1987 |
| JP | S62158996 A | 7/1987 |
| JP | S62136770 U | 8/1987 |
| JP | S62233684 A | 10/1987 |
| JP | S6317961 U | 2/1988 |
| JP | S63169494 A | 7/1988 |
| JP | S6344708 Y2 | 11/1988 |
| JP | 02-084252 A | 3/1990 |
| JP | 02077469 A | 3/1990 |
| JP | H104214191 A | 8/1992 |
| JP | H105308829 A | 11/1993 |
| JP | H105340342 A | 12/1993 |
| JP | H622017 U | 3/1994 |

(56) References Cited

FOREIGN PATENT DOCUMENTS

| | | |
|---|---|---|
| JP | H10645159 Y2 | 11/1994 |
| JP | 10005681 A | 1/1998 |
| JP | H10339588 A | 12/1998 |
| JP | I-11147960 A | 2/1999 |
| JP | H11-503816 A | 3/1999 |
| JP | 11264691 A | 9/1999 |
| JP | 2000073164 A | 3/2000 |
| JP | 2001133195 A | 5/2001 |
| JP | 2002066720 A | 3/2002 |
| JP | 2003037386 A | 2/2003 |
| JP | 2004167334 A | 6/2004 |
| JP | 3102194 U | 7/2004 |
| JP | 2005194624 A | 7/2005 |
| JP | 2006026721 A | 2/2006 |
| JP | 2006205252 A | 8/2006 |
| JP | 2006207950 A | 8/2006 |
| JP | 2006-289481 A | 10/2006 |
| JP | 2006297437 A | 11/2006 |
| JP | 2006337000 A | 12/2006 |
| JP | 2007511735 A | 5/2007 |
| JP | 2007163073 A | 6/2007 |
| JP | 2007203347 A | 8/2007 |
| JP | 2008503047 A | 1/2008 |
| JP | 2008070026 A | 3/2008 |
| JP | 2008239451 A | 10/2008 |
| JP | 2009517625 A | 4/2009 |
| JP | 3178668 U | 9/2012 |
| KR | 1020080076222 A | 8/2008 |
| WO | 9749962 A1 | 12/1997 |
| WO | 0181849 A1 | 1/2001 |
| WO | 2006115073 A1 | 11/2006 |
| WO | 2009056446 A1 | 5/2009 |

OTHER PUBLICATIONS

Stone, K.M., "Review of Literature on Heat Transfer Enchancement in Compact Heat Exchangers", "ACRC TR-105", Aug. 1996, Publisher: Air Conditioning and Refrigeration Center University of Illinois.
Vassoille, Bruno, "PCT Application No. PCT/US2010/050711 International Preliminary Report on Patentability Jan. 27, 2012", , Publisher: PCT, Published in: PCT.
Walberg, Teresa J., "U.S. Appl. No. 12/484,542 Office Action Apr. 5, 2012", Publisher: USPTO, Published in: US.
Vassoille, Bruno, "PCT Application No. PCT/2010/050711 International Search Report Jul. 1, 2011", , Publisher: PCT, Published in: PCT.
Vassoille, Bruno, "PCT Application No. PCT/US2010/050711 Written Opinion of the International Preliminary Examining Authority Nov. 18, 2011", , Publisher: PCT, Published in: PCT.
"Related U.S. Appl. No. 12/484,542 Office Action", Nov. 20, 2012, Publisher: USPTO, Published in: US.
"Related Australian Patent Application No. 2010-303747 Office Action" Mar. 12, 2013, Publisher: IP Australia, Published in: AU.
"Related U.S. Appl. No. 12/628,594 Office Action", Sep. 24, 2012, Publisher: USPTO, Published in: US.
Brandon Michael Rosati, "Related U.S. Appl. No. 12/690,373 Office Action" Apr. 18, 2013, Publisher: USPTO, Published in: US.
"Related Chinese Patent Application No. 2010800452776 Office Action", Sep. 26, 2013, Publisher: CIPO, Published in: CN.
"Related Japanese Patent Application No. 2012-533215 Office Action", Sep. 26, 2013, Publisher: JPO, Published in: JP.
Stephane Ouellette, "Related Canadian Patent Application No: 2,774,682 Office Action", Sep. 9, 2013, Publisher: CIPO, Published in: CA.
"Related U.S. Appl. No. 12/690,373", "Final Office Action", Jan. 30, 2014, Publisher: USPTO, Published in: US.
"Related Korean Patent Application No: KR 10-2012-7011568 Office Action", Oct. 21, 2013, Publisher: KIPO, Published in: KR.
Notification of Reason for Refusal for Japanese Patent Application No. 2012-533215, issued Jun. 27, 2014.
Non-Final Office Action for U.S. Appl. No. 13/301,252, mailed Jul. 11, 2014, 9 pages.
Patent Examination Report No. 1 for Australian Patent Application No. 2010273345, issued Nov. 1, 2012, 3 pages.
Patent Examination Report No. 1 for Australian Patent Application No. 2010273997, issued Nov. 16, 2012, 3 pages.
Patent Examination Report No. 2 for Australian Patent Application No. 2010273997, issued Jul. 17, 2013, 3 pages.
Patent Examination Report No. 3 for Australian Patent Application No. 2010273997, issued Oct. 4, 2013, 3 pages.
Examiners Report for Canadian Patent Application No. 2,766,917, issued Mar. 26, 2012, 2 pages.
Office Action for Canadian Patent Application No. 2,766,917, issued Mar. 21, 2013, 4 pages.
Office Action for Canadian Patent Application No. 2,766,917, issued Apr. 23, 2014, 2 pages.
Office Action for Canadian Patent Application No. 2,767,174, issued Jun. 3, 2013, 3 pages.
Office Action for Canadian Patent Application No. 2,767,174, issued Mar. 6, 2014, 2 pages.
Second Office Action for Chinese Patent Application No. 201080031821.1, issued Nov. 15, 2013, 14 pages.
First Office Action for Chinese Patent Application No. 201080032268.3, issued Dec. 24, 2013, 8 pages.
Second Office Action for Chinese Patent Application No. 201080032268.3, issued Oct. 24, 2014, 17 pages.
Notification of Reason for Refusal for Japanese Patent Application No. 2012-520769, mailed Mar. 5, 2014, 10 pages.
Office Action for Japanese Patent Application No. 2012-520821, mailed May 14, 2014, 6 pages.
Final Rejection for Japanese Patent Application No. 2012-520821, mailed Feb. 9, 2015, 4 pages.
Office Action for Korean Patent Application No. 10-2012-7003687, issued May 31, 2013, 7 pages.
Office Action for Korean Patent Application No. 10-2012-7003687, issued Feb. 27, 2014, 7 pages.
Decision of Refusal for Korean Patent Application No. 10-2012-7003687, issued Dec. 26, 2014, 5 pages.
International Search Report and Written Opinion for PCT/US2010/042079, mailed Mar. 23, 2011, 14 pages.
International Preliminary Report on Patentability for PCT/US2010/042079, mailed Jan. 24, 2012, 19 pages.
International Search Report for PCT/US2010/042333, mailed Jan. 25, 2012, 8 pages.
International Preliminary Report on Patentability for PCT/US2010/042333, mailed Feb. 9, 2012, 7 pages.
Non-Final Office Action for U.S. Appl. No. 12/690,373, mailed Aug. 7, 2013, 11 pages.
Non-Final Office Action for U.S. Patent Appl. No. 12/690,373, mailed Sep. 12, 2014, 12 pages.
Final Office Action for U.S. Appl. No. 13/032,119, mailed Mar. 26, 2015, 16 pages.
Non-Final Office Action for U.S. Appl. No. 13/032,119, mailed Aug. 16, 2013, 15 pages.
Non-Final Office Action for U.S. Appl. No. 13/032,119, mailed Nov. 21, 2013, 19 pages.
Final Office Action for U.S. Appl. No. 13/032,119, mailed Jan. 3, 2014, 14 pages.
Final Office Action for U.S. Appl. No. 13/301,252, mailed Sep. 8, 2014, 9 pages.
Final Office Action for U.S. Appl. No. 12/628,594, mailed Mar. 1, 2013, 9 pages.
Examiners Answer for U.S. Appl. No. 12/628,594, mailed Oct. 24, 2013, 12 pages.
Restriction Requirement for U.S. Appl. No. 12/836,688, mailed Jul. 31, 2013, 9 pages.
Restriction Requirement and Interview Summary for U.S. Appl. No. 12/836,688, mailed Aug. 23, 2013, 11 pages.
Non-Final Office Action for U.S. Appl. No. 12/836,688, mailed Nov. 6, 2013, 15 pages.
Non-Final Office Action for U.S. Appl. No. 12/836,688, mailed Dec. 5, 2014, 14 pages.

(56) References Cited

OTHER PUBLICATIONS

Non-Final Office Action for U.S. Appl. No. 12/838,114, mailed Apr. 10, 2013, 13 pages.
Final Office Action for U.S. Appl. No. 12/838,114, mailed Aug. 8, 2013, 15 pages.
Non-Final Office Action for U.S. Appl. No. 13/032,119, mailed Dec. 4, 2014, 17 pages.
Final Office Action for U.S. Appl. No. 12/690,373, mailed Apr. 30, 2015, 11 pages.
Non-Final Office Action for U.S. Appl. No. 13/301,252, mailed Apr. 29, 2015, 11 pages.
Advisory Action for U.S. Appl. No. 13/032,119, mailed Jun. 30, 2015, 3 pages.
Final Office Action for U.S. Appl. No. 12/836,688, mailed Jun. 5, 2015, 14 pages.
Notice of Allowance for U.S. Appl. No. 12/484,542, mailed Mar. 22, 2013, 8 pages.
First Office Action for Korean Patent Application No. 10-2015-7007662, mailed May 12, 2015, 8 pages.
Examination Report for European Patent Application No. 10 740 788.4, mailed May 20, 2015, 4 pages.
Third Office Action for Chinese Patent Application No. 201080032268.3, issued Nov. 23, 2015, 4 pages.
Advisory Action and Applicant-Initiated Interview Summary for U.S. Appl. No. 12/836,688, mailed Sep. 11, 2015, 6 pages.
Non-Final Office Action for U.S. Appl. No. 13/032,119, mailed Oct. 23, 2015, 15 pages.
Notice of Allowance for U.S. Appl. No. 13/301,252, mailed Sep. 30, 2015, 10 pages.
Reasons for Decision of Rejection for Korean Divisional Patent Application No. 10-2015-7007662, mailed Apr. 28, 2016, 5 pages.
Decision on Appeal for U.S. Appl. No. 12/628,594, mailed Apr. 19, 2016, 6 pages.
Applicant-Initiated Interview Summary for U.S. Appl. No. 12/836,688, mailed Mar. 9, 2016, 4 pages.
Final Office Action for U.S. Appl. No. 13/032,119, mailed Mar. 1, 2016, 20 pages.
Advisory Action for U.S. Appl. No. 13/032,119, mailed May 10, 2016, 3 pages.
Notice of Reasons for Rejection for Japanese Patent Application No. 2015-037591, mailed Dec. 11, 2015, 17 pages.
Reasons for Decision of Rejection for Korean Divisional Patent Application No. 10-2015-7007662, mailed Dec. 24, 2015, 5 pages.
First Office Action for Korean Patent Application No. 10-2012-7003688, mailed Aug. 31, 2016, 12 pages.
Examination Report for European Patent Application No. 10763940.3, mailed Oct. 4, 2016, 5 pages.
Non-Final Office Action for U.S. Appl. No. 12/628,594, mailed Oct. 26, 2016, 11 pages.
Non-Final Office Action for U.S. Appl. No. 12/838,114, mailed Nov. 3, 2016, 16 pages.
Decision of Rejection for Japanese Patent Application No. 2015-037591, mailed Aug. 23, 2016, 13 pages.
Notice of Allowance for U.S. Appl. No. 12/836,688, mailed Jun. 22, 2016, 8 pages.
Decision on Appeal for U.S. Appl. No. 12/838,114, mailed Aug. 10, 2016, 6 pages.
Non-Final Office Action for U.S. Appl. No. 13/032,119, mailed Aug. 12, 2016, 27 pages.
Non-Final Office Action for U.S. Appl. No. 12/836,688, mailed Dec. 14, 2015, 8 pages.
Pretrial Report for Japanese Patent Application No. 2015-037591, mailed Jan. 31, 2017, 6 pages.
Final Office Action for U.S. Appl. No. 12/838,114, mailed Mar. 1, 2017, 18 pages.
Notice of Allowance and Examiner-Initiated Interview Summary for U.S. Appl. No. 13/032,119, mailed Jan. 18, 2017, 18 pages.
Final Office Action for U.S. Appl. No. 121628,594, dated Apr. 7, 2017, 10 pages.
Advisory Action, Examiner-Initiated Interview Summary, and AFCP 2.0 Decision for U.S. Appl. No. 12/628,594, dated Jun. 23, 2017, 4 pages.
Non-Final Office Action and Applicant-Initiated Interview Summary for U.S. Appl. No. 12/838,114, dated Jun. 26, 2017, 20 pages.
Examination Report for European Patent Application No. 10763940.3, dated May 10, 2017, 4 pages.

* cited by examiner

FIG. 8

MODULAR HEAT EXCHANGER

FIELD OF THE INVENTION

The present invention relates to energy conversion in general, and, more particularly, to heat exchangers.

BACKGROUND OF THE INVENTION

The Earth's oceans are continually heated by the sun and cover nearly 70% of the Earth's surface. The temperature different between deep and shallow waters contains a vast amount of solar energy that can potentially be harnessed for human use. In fact, it is estimated that the thermal energy contained in the temperature difference between the warm ocean surface waters and deep cold waters within ±10° of the Equator represents a 3 Tera-watt ($3 \times 10^{12}$ W) resource.

The total energy available is one or two orders of magnitude higher than other ocean-energy options such as wave power, but the small magnitude of the temperature difference makes energy extraction comparatively difficult and expensive, due to low thermal efficiency.

Ocean thermal energy conversion ("OTEC") is a method for generating electricity which uses the temperature difference that exists between deep and shallow waters to run a heat engine. A heat engine is a thermodynamic device placed between a high temperature reservoir and a low temperature reservoir. As heat flows from one reservoir to the other, the engine converts some of the heat to work. This principle is used in steam turbines and internal combustion engines. Rather than using heat energy from the burning of fuel, OTEC power draws on temperature differences caused by the sun's warming of the ocean surface.

One heat cycle suitable for OTEC is the Rankine cycle, which uses a low-pressure turbine. Systems may be either closed-cycle or open-cycle. Closed-cycle systems use a fluid with a low boiling point, such as ammonia, to rotate the turbine to generate electricity. Warm surface seawater is pumped through a heat exchanger where the low-boiling-point fluid is vaporized. The expanding vapor turns the turbo-generator. Then, cold, deep seawater—pumped through a second heat exchanger—condenses the vapor back into a liquid, which is then recycled through the system. Open-cycle engines use the water heat source as the working fluid.

As with any heat engine, the greatest efficiency and power is produced with the largest temperature difference. This temperature difference generally increases with decreasing latitude (i.e., near the equator, in the tropics). But evaporation prevents the surface temperature from exceeding 27° C. Also, the subsurface water rarely falls below 5° C. Historically, the main technical challenge of OTEC was to generate significant amounts of power, efficiently, from this very small temperature ratio. But changes in the efficiency of modern heat exchanger designs enables performance approaching the theoretical maximum efficiency.

OTEC systems have been shown to be technically viable, but the high capital cost of these systems has thwarted commercialization. Heat exchangers are the second largest contributor to OTEC plant capital cost (the largest is the cost of the offshore moored vessel or platform). The optimization of the enormous heat exchangers that are required for an OTEC plant is therefore of great importance and can have a major impact on the economic viability of OTEC technology.

There are many existing heat-exchanger designs that can be considered for use in an OTEC system. But as the following discussion shows, there are, as a practical matter, no good choices.

Conventional "shell and tube" heat exchangers are widely available for marine use. But the overall heat transfer coefficient, U, that is associated with reasonable pressure drops for OTEC is typically below 2000 W/m²K. This drives the size and cost for this type of heat exchanger too high for economic consideration.

Compact heat exchangers/plate-frame designs, which comprise many narrowly separated plate pairs, are extensively used in the chemical and pharmaceutical industries. The U value for plate-frame designs may approach 2300-2500 W/m²K. In order to achieve this level of heat transfer in an OTEC system, however, high pumping power is necessary to force seawater through the heat exchanger to overcome a pressure drop that can exceed 5 psi (3.5 m head loss). Further, the upper value of the heat transfer coefficient is restricted by the use of materials such as high-alloy steel or titanium (which have relatively poor thermal conductivity but mitigate the effects caused by exposure to corrosive materials, such as chlorides, etc.), by the minimum plate thickness needed for stamped plate design, and by the relatively low water flow velocities required to maintain an acceptable pressure drop.

OTEC-optimized tube designs also fall into the compact heat exchanger category. These include Vertical Fluted Tube and Folded Tube heat exchangers. Both have somewhat higher U values than plate-frame designs: typically in the range of about 2700-3400 W/m²K. But a substantial pressure drop and potential for crevice corrosion in regions of stagnant flow are a concern for the optimized tube designs.

Brazed aluminum-fin heat exchangers are used throughout the cryogenics industry. These heat exchangers see large scale marine use in Liquid Natural Gas (LNG) re-gasification facilities. Brazed aluminum-fin heat exchangers were developed and tested for OTEC use in the 1980s at Argonne National Labs (ANL). See, U.S. Pat. No. 4,276,927 ("Plate type heat exchanger") and U.S. Pat. No. 4,478,277 ("Heat exchanger having uniform surface temperature and improved structural strength").

There are several technical challenges associated with the use of brazed-fin heat exchangers, however. First, brazed joints used to join the fins are highly susceptible to corrosion when exposed to seawater. Therefore, these joints must be isolated from seawater passages to reduce the potential for corrosion. In some cases, aluminum extrusions are added to protect brazed joints from exposure to seawater. The cost of adding such corrosion-resistant extrusions can be prohibitive, however.

Second, the small passages found in typical brazed-fin heat exchangers are prone to biofouling.

Third, performing maintenance, such as refitting, repair, and refurbishment, on heat exchangers is challenging due to the difficulty of accessing their internal regions.

Through the mid 80's to the early 90s, various aluminum heat exchanger modules and alloys were tested in an actual OTEC environment. These instrumented and remotely-monitored tests correlated heat transfer performance and seawater chemical and physical properties with corrosion in the heat exchangers. As a result of this extended testing, it was concluded that several relatively inexpensive aluminum alloys should survive well in an OTEC application.

The form factor for the heat exchangers being tested was mostly shell and tube type. It was concluded that fabrication, out of aluminum, of shell-and-tube heat exchangers of sufficient surface area would be prohibitively expensive. "Roll bond" heat exchanger panels were proposed as an alternative, which provide the larger surface areas required for OTEC applications at roughly twenty percent the cost of equivalent shell and tube units.

In 1989, roll-bond panels were inserted into some the heat exchangers that were being tested in the OTEC environment. This testing led to the development of roll-bond type heat exchanger panels that were actually installed in a 50 kW plant built in 1996. During the first year of testing, serious ammonia leaks were experienced due to corrosion. The corrosion was due to electrolysis, which was caused by the spacer material between the aluminum panels.

The heat exchangers were re-manufactured and, after some difficulties with brazing associated with the inlets/outlets, the plant was reassembled and additional performance and corrosion data were collected. Based on these results, additional roll-bond modules were fabricated and tested in a simulated OTEC environment at a power plant in England.

By the mid-1990s, government funding of OTEC had concluded. Remaining hurdles for compact aluminum heat exchangers at that time included concerns over the placement of brazed sections within a heat exchanger core.

With today's growing need for energy, using a renewable constant source is a desirable solution. As a consequence, there is a renewed interest in OTEC power plants. But development of an OTEC heat exchanger that accommodates high flow rates while minimizing pumping parasitic losses and offering long life in the ocean environment remains elusive.

SUMMARY OF THE INVENTION

The present invention provides a modular heat exchanger that is less susceptible to corrosion and can be serviced more easily and/or less expensively than heat exchangers of the prior art. Heat exchangers in accordance with the present invention comprise modules for conveying primary fluid through the heat exchanger, wherein the modules are individually removable. As a result, each module can be easily repaired, replacement, and/or refurbished. Some embodiments of the present invention comprise substantially materials that are non-corrosive with respect to seawater. Some embodiments of the present invention comprise materials that are subject to corrosion with respect to seawater; however, in these embodiments these materials are isolated from seawater during use.

Although embodiments of the present invention are particularly well-suited for use in OTEC systems, embodiments in accordance with the present invention are also suited for use in other heat exchanger applications.

Embodiments of the present invention comprise a plurality of plate assemblies, each of which comprises channels for conveying primary fluid (e.g., working fluid). The plate assemblies are arranged in a frame such that they collectively define a plurality of conduits for conveying secondary fluid (e.g. seawater). Each plate assembly is held in the frame by a clamp, such that each plate assembly is detachably mounted in the frame.

An input manifold provides primary fluid to the channels and an output manifold receives primary fluid from the channels. The input and output manifolds are fluidically coupled with the channels through couplings that can be readily attached and detached. These detachably connectable couplings facilitate removal of individual plate assemblies from the heat exchanger.

In some embodiments, all components of the heat exchanger that are exposed to seawater (or other secondary fluid) are made of materials that are corrosion resistant for seawater. In some embodiments, all components of the heat exchanger that are exposed to seawater (or other secondary fluid) are made of the same material and these components are joined using a substantially galvanic corrosion-free joining technology, such as friction-stir welding.

In some embodiments, brazed joints are used to join some components. In such embodiments, seals are included that fluidically isolate brazed joints from potentially corrosive fluids, such as seawater.

In some embodiments, a plate assembly comprises a thermally conductive graphite foam core that includes channels for conveying the primary fluid.

An embodiment of the present invention comprises: a modular heat exchanger comprising a frame; a first plate that is demountably attachable to the frame, wherein the first plate comprises a first plurality of channels, and wherein each of the first plurality of channels comprises an inlet that is detachably connectable with an input port for a first fluid, and an outlet that is detachably connectable with an output port for the first fluid; and a second plate that is demountably attachable to the frame, wherein the second plate comprises a second plurality of channels, and wherein each of the second plurality of channels comprises an inlet that is detachably connectable with an input port for a first fluid, and an outlet that is detachably connectable with the output port; wherein the first plate and the second plate collectively define a first conduit for conveying a second fluid when the first plate and second plate are attached with the frame, and wherein the first conduit is fluidically isolated from the first plurality of channels and the second plurality of channels.

DETAILED DESCRIPTION

Figure 1:
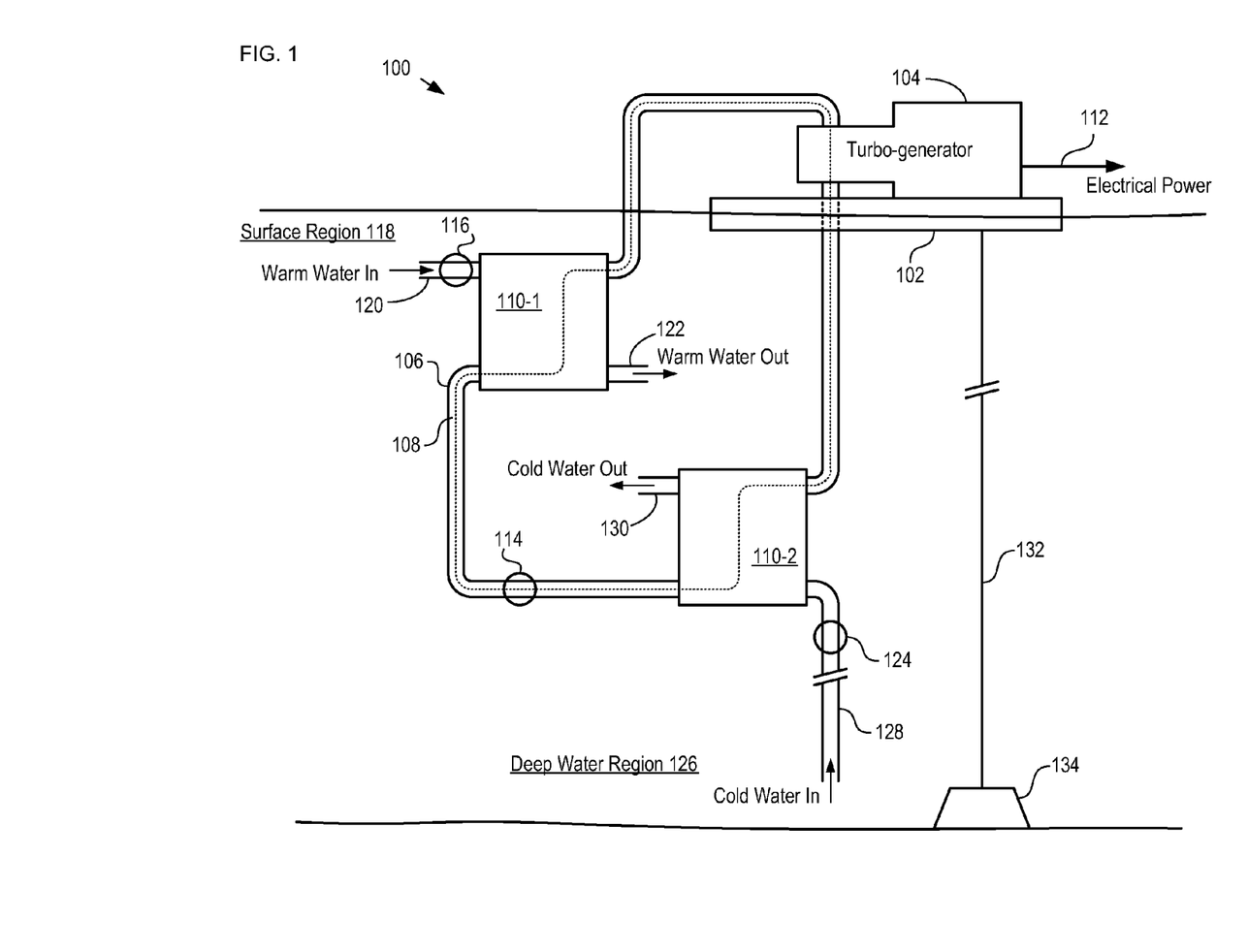
FIG. 1 depicts a schematic diagram of an OTEC power generation system in accordance with an illustrative embodiment of the present invention.

FIG. 1 depicts a schematic diagram of an OTEC power generation system in accordance with an illustrative embodiment of the present invention. OTEC system 100 comprises turbogenerator 104, closed-loop conduit 106, heat exchanger 110-1, heat exchanger 110-2, pumps 114, 116, and 124, and conduits 120, 122, 128, and 130.

Turbo-generator 104 is a conventional turbine-driven generator. Turbogenerator 104 is mounted on floating platform 102, which is a conventional floating energy-plant platform. Platform 102 is anchored to the ocean floor by mooring line 132 and anchor 134, which is embedded in the ocean floor. In some instances, platform 102 is not anchored to the ocean floor but is allowed to drift. Such a system is sometimes referred to as a "grazing plant."

In typical operation, pump 114 pumps a primary fluid (i.e., working fluid 108), in liquid form, through closed-loop conduit 106 to heat exchanger 110-1. Ammonia is often used as working fluid 108 in OTEC systems; however, it will be clear to one skilled in the art that any fluid that evaporates at the temperature of the water in surface region 118 and condenses at the temperature of the water in deep water region 126 is suitable for use as working fluid 108 (subject to material compatibility requirements).

Heat exchanger 110-1 and 110-2 are configured for operation as an evaporator and condenser, respectively. One skilled in the art will recognize that the operation of a heat exchanger as evaporator or condenser is dependent upon the manner in which it is configured within system 100. Heat exchanger 110 is described in detail below and with respect to FIG. 2.

In order to enable its operation as an evaporator, pump 116 draws warm secondary fluid (i.e., seawater from surface region 118) into heat exchanger 110-1 via conduit 120. At heat exchanger 110-1 heat from the warm water is absorbed by working fluid 108, which induces working fluid 108 to vaporize. After passing through heat exchanger 110-1, the warm water is ejected back into the body of water via conduit 122. In a typical OTEC deployment, the water is surface region 118 is at a substantially constant temperature of approximately 25 degrees centigrade (subject to weather and sunlight conditions).

The expanding working fluid 108 vapor is forced through turbogenerator 104, thereby driving the turbogenerator to generate electrical energy. The generated electrical energy is provided on output cable 112. Once it has passed through turbogenerator 104, the vaporized working fluid enters heat exchanger 110-2.

At heat exchanger 110-2, pump 124 draws cold secondary fluid (i.e., seawater from deep water region 126) into heat exchanger 110-2 via conduit 128. The cold water travels through heat exchanger 110-2 where it absorbs heat from the vaporized working fluid. As a result, working fluid 108 condenses back into liquid form. After passing through heat exchanger 110-2, the cold water is ejected into the body of water via conduit 130. Typically deep water region 126 is 1000+ meters below the surface of the body of water, at which depth water is at a substantially constant temperature of a few degrees centigrade.

Pump 114 pumps the condensed working fluid 108 back into heat exchanger 110-1 where it is again vaporized; thereby continuing the Rankine cycle that drives turbogenerator 104.

Figures 2, 4:
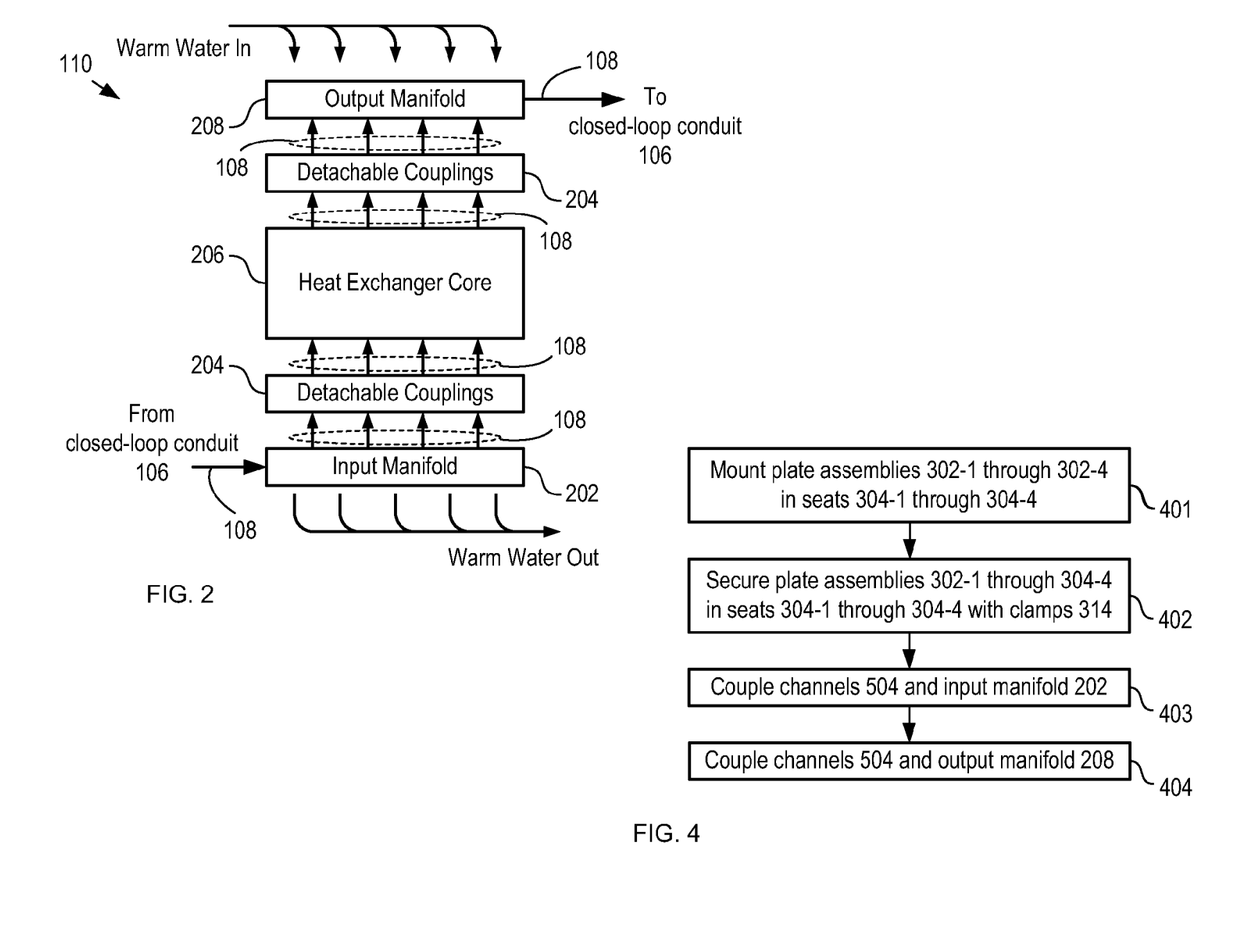
FIG. 2 depicts a schematic diagram of a heat exchanger in accordance with the illustrative embodiment of the present invention.
FIG. 4 depicts operations of a method suitable for forming heat exchanger 110.

FIG. 2 depicts a schematic diagram of a heat exchanger in accordance with the illustrative embodiment of the present invention. Heat exchanger 110 comprises input manifold 202, detachable couplings 204, heat exchanger core 206, and output manifold 208.

Figure 3:
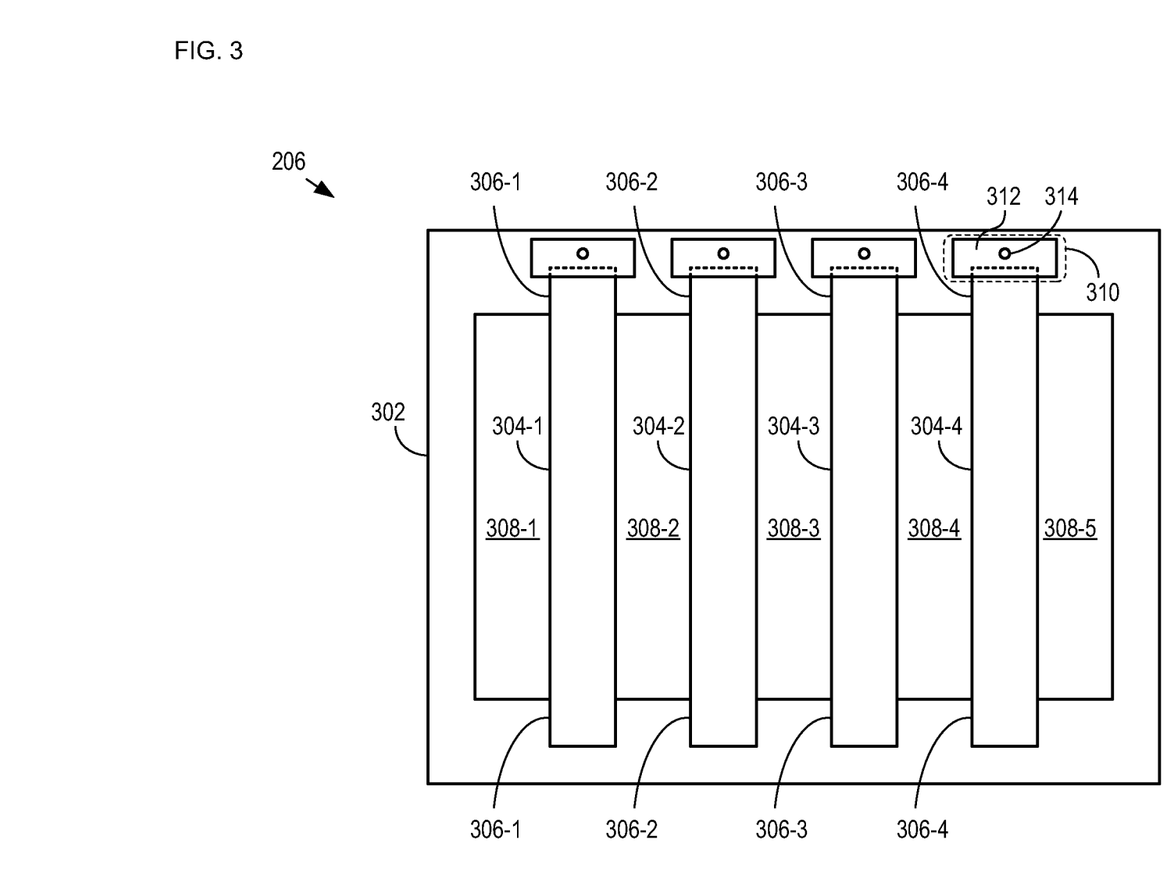
FIG. 3 depicts a heat exchanger core in accordance with the illustrative embodiment.

FIG. 3 depicts a heat exchanger core in accordance with the illustrative embodiment. Core 206 is a modular heat exchanger core that comprises frame 302, plate assemblies 304-1 through 304-4, and clamps 314.

FIG. 4 depicts operations of a method suitable for forming heat exchanger 110. FIG. 4 is described herein with continuing reference to FIGS. 1-3 and reference to FIGS. 5-7. Method 400 begins with operation 401, wherein plate assemblies 304-1 through 304-4 are inserted into seats 306-1 through 306-4, respectively. Although the illustrative embodiment comprises four plate assemblies, it will be clear to one skilled in the art, after reading this specification, how to specify, make, and use alternative embodiments of the present invention that comprise any practical number of plate assemblies.

Frame 302 is a rigid frame comprising seats 306-1 through 306-4 (collectively referred to as seats 306) for receiving and locating plate assemblies 304-1 through 304-4 (collectively referred to as plate assemblies 304). Seats 306 locate plate assemblies 304 such that each pair of adjacent plate assemblies defines a conduit for conveying secondary fluid. For example, seats 306-1 and 306-2 locate plate assemblies 304-1 and 304-2 such that these plate assemblies define conduit 308-2. In similar fashion, seats 306-3 and 306-4 locate plate assemblies 304-3 and 304-4 such that these plate assemblies define conduit 308-4. Further, seats 306-1 and 306-4 locate plate assemblies 304-1 and 304-4 away from the sidewalls of frame 302 such that frame 302 and the plate assemblies collectively define conduits 308-1 and 308-5. For clarity, input and output manifolds for secondary fluid are not depicted. It will be clear to one skilled in the art, after reading this specification, how to specify, make, and use input and output manifolds for secondary fluid.

Figure 5A:
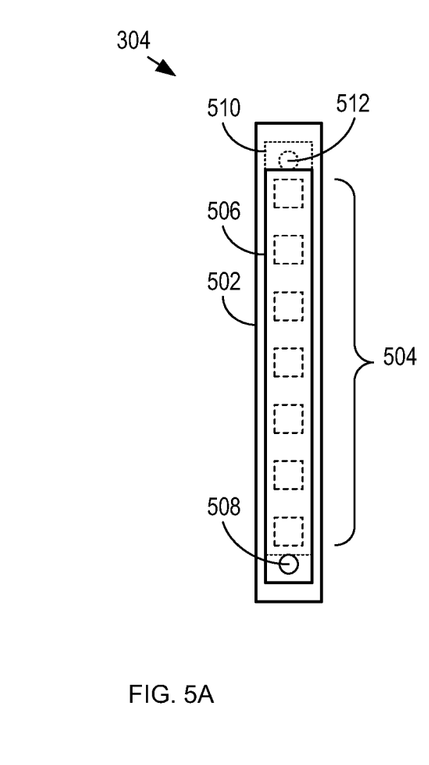
FIG. 5A depicts a front view of an individually removable plate assembly in accordance with the illustrative embodiment of the present invention.
Figure 5B:
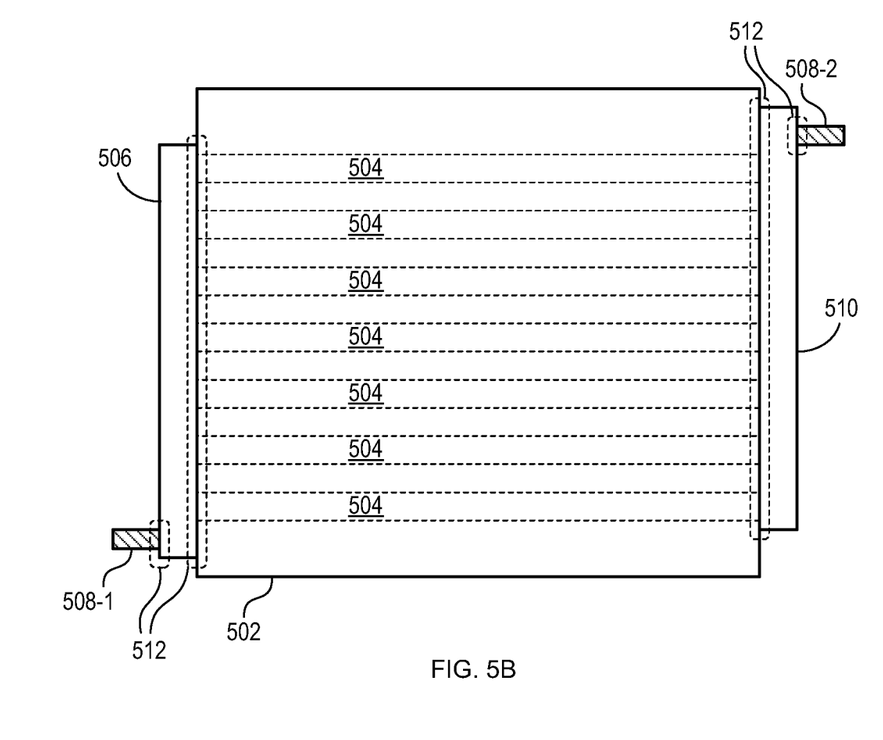
FIG. 5B depicts a side view of an individually removable plate assembly in accordance with the illustrative embodiment of the present invention.

FIGS. 5A and 5B depict front and side views, respectively, of an individually removable plate assembly in accordance with the illustrative embodiment of the present invention. Plate assembly 304 comprises plate 502, distributors 506 and 510, and nipples 508-1 and 508-2.

Plate 502 is a rigid extrusion of aluminum alloy comprising a plurality of internal channels 504. Each of channels 504 is suitable for conveying working fluid 108. Although in the illustrative embodiment plate 502 is aluminum alloy, it will be clear to one skilled in the art, after reading this specification, how to specify, make, and use plates that are made of any material that is substantially corrosive-resistant for working fluid 108. Suitable materials for use in elements of plate assembly 304 include, without limitation, aluminum alloy, aluminum, composite materials, ceramics, and the like.

It will be clear to one skilled in the art, after reading this specification, that heat exchanger 100 can be configured so that channels 504 convey secondary fluid and conduits 308 convey primary fluid.

Distributors 506 and 510 are substantially identical housings of aluminum alloy that are joined to plate 502 with joints 512. Joints 512 are friction-stir welding joints, which are substantially galvanic corrosion-free joints. Distributor 506 receives working fluid 108 from nipple 508-1 and provides it to channels 504. Distributor 510 receives working fluid 108 from channels 504 and provides it to nipple 508-2. Nipples 508-1 and 508-2 are threaded connectors that mate with detachable couplings 204. Nipples 508-1 and 508-2 are also made of the aluminum alloy and are joined to distributors 506 and 510, respectively, with joints 512. Although in the illustrative embodiment, plate 502, distributors 506 and 510, and nipples 508-1 and 508-2 are joined together using friction-stir welding, it will be clear to one skilled in the art, after reading this specification, how to specify, make, and use alternative embodiments of the present invention wherein these elements are joined using a different joining technology that is substantially galvanic corrosion-free.

At operation 402, plate assemblies 304 are secured in seats 306 by clamps 310. Clamps 310 are independently removable. As a result, plate assemblies 304 are demountably attachable with respect to frame 302. For the purposes of this Specification, including the appended claims, the term "demountably attachable" is defined as attachable in a non-permanent manner, such as through the use of a removable fastener (e.g., a screw, clamp, bolt, etc.). Individual plate assemblies 304, therefore, can be independently removed so that each plate assembly can be independently replaced, serviced, or refurbished. In some embodiments, each of plate assemblies 304 is serviceable while heat exchanger 110 is submerged at its operational depth.

Clamps 310 comprise corrosion-resistant plates 312, which are secured to frame 302 by corrosion-resistant screws 314. Clamps 310 are merely representative of a mechanism suitable for securing plate assemblies 304 in seats 306 and one skilled in the art will be able to devise any number of alternative clamping devices that are in accordance with the present invention.

At operation 403, input manifold 202 is fluidically coupled with channels 504 of heat exchanger core 206.

Figure 6:
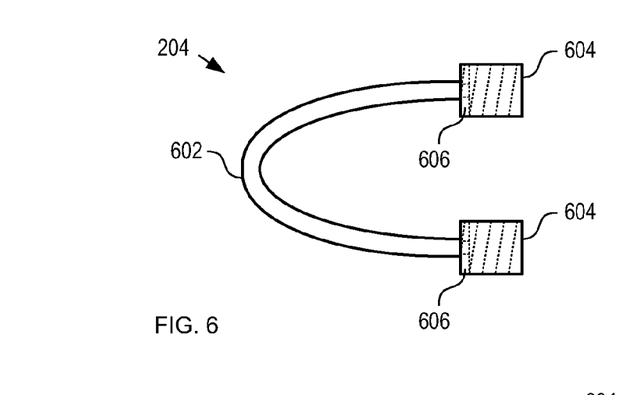
FIG. 6 depicts a schematic drawing of a detachable coupling in accordance with the illustrative embodiment of the present invention.

FIG. 6 depicts a schematic drawing of a detachable coupling in accordance with the illustrative embodiment of the present invention. Detachable coupling 204 is a connectorized flexible conduit for fluidically coupling heat exchanger core to input manifold 202 or output manifold 208. By virtue of detachable couplings 204, each of input manifold 202 and output manifold 208 is detachably connectable with respect to the inlet and outlet, respectively, of channels 504. For the purposes of this Specification, including the appended claims, the term "detachably connectable" is defined as connectable in a non-permanent way, such as through a connection that can be readily made and broken. Detachable coupling 204 comprises conduit 602 and connectors 604.

Conduit 602 is a flexible conduit of substantially corrosion-resistant material. In some embodiments, conduit 602 is substantially rigid.

Connectors 604 are threaded connectors that mate with nipples 508 to form a leak-proof seal. In some embodiments, gasket 606 is included in connector 604 to improve the integrity of the leak-proof seal. In some embodiments, connectors 604 and nipples 508 are components other than conventional threaded connectors. Fluidic coupling systems suitable for use in accordance with the present invention include, without limitation: click-to-connect connectors (i.e., snap-ring connectors), such as quick-disconnect fluidic connectors; upchurch connectors; blindmate connectors; thread-to-connect connectors; heparin-lock connectors; and the like. It will be clear to one skilled in the art, after reading this specification, how to specify, make, and use connectors 604 and nipples 508.

In some embodiments, couplings 204 and 208 are made of the same material as the plate, distributors, and nipples to mitigate the effects of galvanic corrosion.

In some embodiments, detachable couplings 204 are bulkhead elements suitable for making direct rigid fluidic connection between input and output manifolds 202 and 208 and plate assemblies 304. Detachable couplings suitable for use in accordance with the present invention include, without limitation, pressure fittings, hydraulic fittings, upchurch connectors, blindmate connectors, rapid-disconnect hydraulic line connectors, and the like. It will be clear to one skilled in the art, after reading this specification, how to specify, make, and use detachable couplings other than flexible conduits and threaded connectors.

Figure 7:
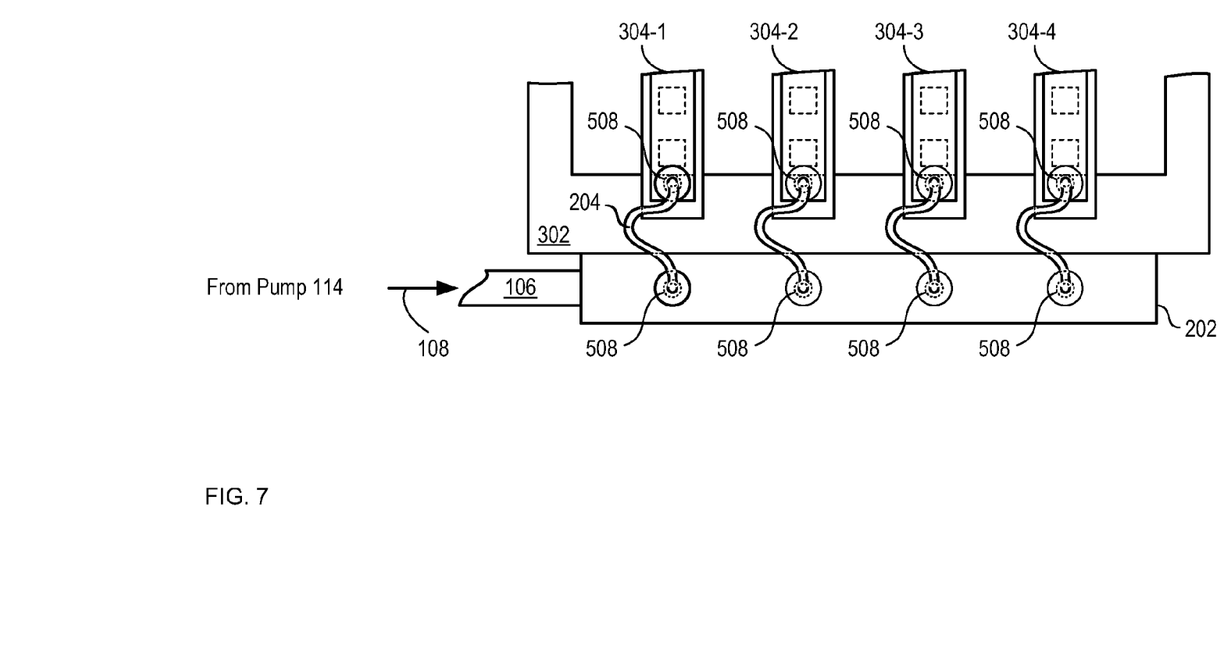
FIG. 7 depicts a schematic drawing of an input manifold coupled to a heat exchanger core.

FIG. 7 depicts a schematic drawing of an input manifold coupled to a heat exchanger core. Input manifold 202 is a housing of aluminum alloy that is joined to frame 302 using friction-stir welding. Input manifold 202 is fluidically coupled with distributors 506 by detachable couplings 204. Detachable couplings 204 are connected to nipples 508 of input manifold 202 and nipples 508 of plate assemblies 304.

Figure 8:
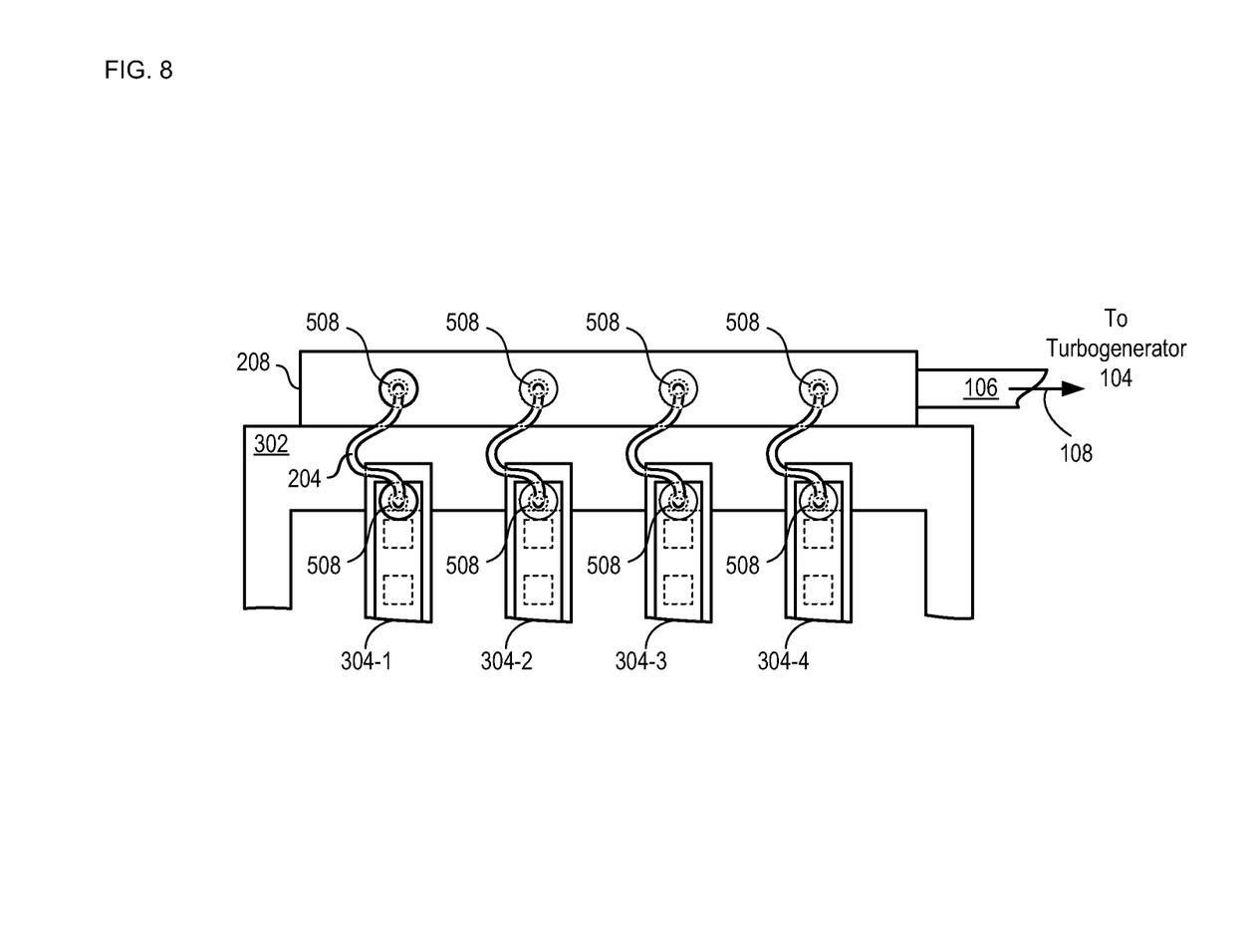
FIG. 8 depicts a schematic drawing of an output manifold coupled to a heat exchanger core.

FIG. 8 depicts a schematic drawing of an output manifold coupled to a heat exchanger core. Output manifold 208 is a housing of aluminum alloy that is joined to frame 302 using friction-stir welding. Output manifold 208 is fluidically coupled with distributors 506 by detachable couplings 204. Detachable couplings 204 are connected to nipples 508 of output manifold 208 and nipples 508 of plate assemblies 304. It will be clear to one skilled in the art, after reading this specification, that the material used for input manifold 202 and output manifold 208 can be selected from any material suitable for use in heat exchanger core 206, as discussed above.

Figure 9A:
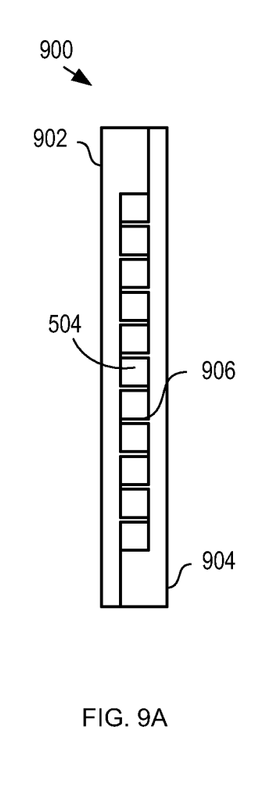
FIG. 9A depicts a schematic drawing of a plate assembly in accordance with a first alternative embodiment of the present invention.

FIG. 9A depicts a schematic drawing of a plate assembly in accordance with a first alternative embodiment of the present invention. Plate assembly 900 comprises panel 902 and panel 904. Panels 902 and 904 are extruded panels of aluminum alloy. Each of panels 902 and 904 comprises a plurality of fins 906. Panels 902 and 904 are joined with friction-stir welding such that fins 906 collectively define a plurality of channels 504. In some embodiments, fins 906 do not span the full separation distance between panels 902 and 904; therefore, in such embodiments panels 902 and 904 collectively define a single conduit into which fins 906 partially extend. In some embodiments, panels 902 and 904 comprise a different material that is substantially corrosion-resistant for working fluid 108 and seawater.

Figure 9B:
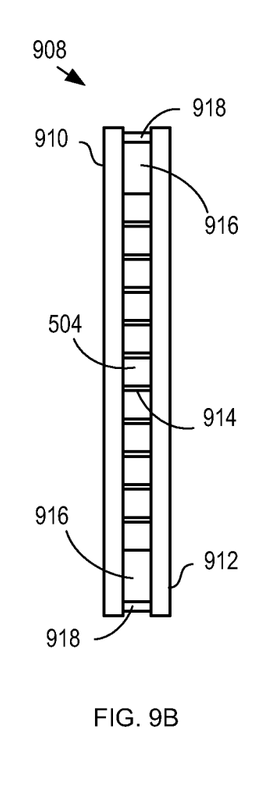
FIG. 9B depicts a schematic drawing of a plate assembly in accordance with a second alternative embodiment of the present invention.

FIG. 9B depicts a schematic drawing of a plate assembly in accordance with a second alternative embodiment of the present invention. Plate assembly 908 comprises panel 910, panel 912, fins 914, supports 916, and seals 918. Fins 906 and supports 916 are brazed onto panels 910 and 912 to collectively define channels 504. Since brazed connections are highly susceptible to galvanic corrosion in the presence of seawater, seals 918 are formed between panels 910 and 912 to substantially isolate all brazed connections from exposure to seawater.

Figure 9C:
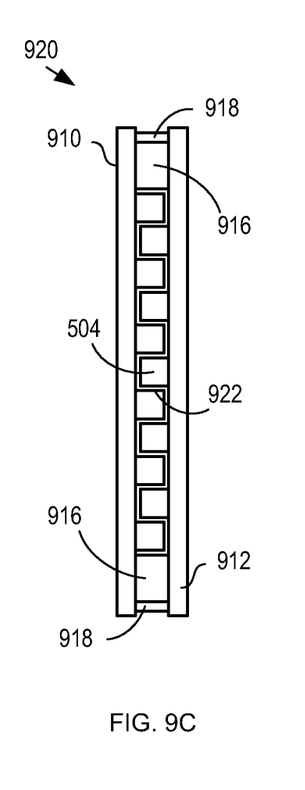
FIG. 9C depicts a schematic drawing of a plate assembly in accordance with a third alternative embodiment of the present invention.

FIG. 9C depicts a schematic drawing of a plate assembly in accordance with a third alternative embodiment of the present invention. Plate assembly 920 comprises panel 910, panel 912, interposer 922, supports 916, and seals 918. Interposer 922 and supports 916 are brazed onto panels 910 and 912 to collectively define channels 504. Seals 918 are formed between panels 910 and 912 to substantially isolate all brazed connections from exposure to seawater. Although the third alternative embodiment comprises an interposer having u-shaped regions that partially define channels 504, it will be clear to one skilled in the art, after reading this specification, how to specify, make, and use other alternative embodiments of the present invention that comprise an interposer having regions of any suitable shape.

Figure 9D:
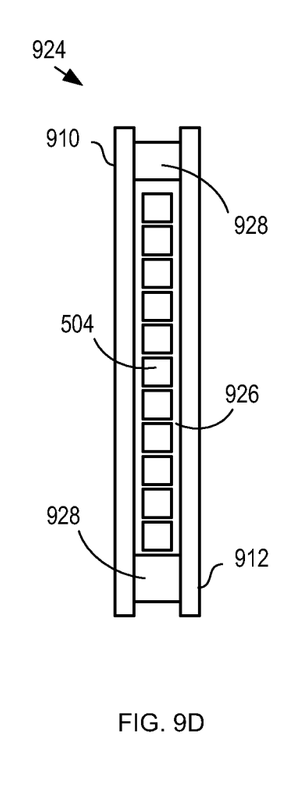
FIG. 9D depicts a schematic drawing of a plate assembly in accordance with a fourth alternative embodiment of the present invention.

FIG. 9D depicts a schematic drawing of a plate assembly in accordance with a fourth alternative embodiment of the present invention. Plate assembly 924 comprises panel 910, panel 912, interposer 926, and supports 928. Supports 928 are stand-offs of aluminum alloy. Interposer 926 is bonded to panels 910 and 912. Since supports 928 and panels 910 and 912 are all made of the same material, friction-stir welding is the preferred technique for joining these elements together.

Interposer 926 is an extruded sheet of thermally conductive graphite foam that comprises a plurality of channels 504. Graphite foam provides suitable structural integrity for plate assembly 924. In addition, a typical graphite foam composition has a specific gravity within the range of 0.5-0.7. As a result, graphite foam-based interposer 926 enables heat exchangers that can be lighter than comparable conventional metal-based heat exchangers.

Further, graphite foam has a bulk thermal conductivity of approximately 180 W/M Deg C range. This thermal conductivity is as high as pure bulk aluminum, for example, and much higher than the effective conductivity of most aluminum fin constructions.

Still further, interposer 926 can comprise graphite wall surfaces that are characterized by open pores. This allows evaporation and condensation to occur over a much larger surface area than comparable conventional heat exchangers. As a result, heat exchangers in accordance with the present invention can exhibit reduced volume for a given heat transfer duty, as compared to prior art shell and tube and plate-frame heat exchangers.

Although the fourth alternative embodiment comprises an interposer having square-shaped channels 504, it will be clear to one skilled in the art, after reading this specification, how to specify, make, and use other alternative embodiments of the present invention that comprise an interposer having regions of any suitable shape.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A modular heat exchanger comprising:
   a heat exchanger core configured for ocean thermal energy conversion comprising:
   a frame comprising a plurality of spaced-apart seats;
   a plurality of plate assemblies, each plate assembly comprising:
      two spaced-apart side panels joined at end portions by supports brazed to the two spaced-apart side panels, each side panel comprising a rigid extrusion of a material substantially resistant to corrosion from exposure to seawater and to a working fluid; and
      an interposer brazed to at least one spaced-apart side panel of the two spaced-apart side panels to form an internal structure and define at least one channel between the two spaced-apart side panels,
   wherein each spaced-apart seat of the plurality of spaced-apart seats is configured to receive a corresponding plate assembly of the plurality of plate assemblies and define a plurality of conduits for the seawater, each conduit of the plurality of conduits defined between a corresponding pair of adjacent plate assemblies of the plurality of plate assemblies,
   wherein the at least one channel is configured to convey the working fluid, and
   wherein each plate assembly of the plurality of plate assemblies is configured to detachably mount into a respective spaced-apart seat of the plurality of spaced-apart seats; and
   a plurality of inlet distributors, wherein each inlet distributor is joined to a respective plate assembly of the plurality of plate assemblies by a respective galvanic-corrosion-free joint to place the inlet distributor in fluidic communication with the at least one channel of the respective plate assembly; and
   an input manifold, fluidically coupled to the plurality of inlet distributors by a respective plurality of detachable couplings, each detachable coupling of the plurality of detachable couplings independently connectable and removable, the input manifold configured to convey the working fluid to each inlet distributor.

2. The modular heat exchanger of claim 1 wherein each detachable coupling of the plurality of detachable couplings comprises one of a click-to-connect connector, a quick-disconnect fluid connector, and a thread-to-connect connector.

3. The modular heat exchanger of claim 1 wherein at least some of the detachable couplings of the plurality of detachable couplings comprise a flexible conduit and two connectors.

4. The modular heat exchanger of claim 1 further comprising a friction-stir-weld joint that joins the input manifold and the frame to one another.

5. The modular heat exchanger of claim 1 further comprising a plurality of clamps, wherein each clamp of the plurality of clamps is configured to secure a corresponding plate assembly of the plurality of plate assemblies to a respective spaced-apart seat of the plurality of spaced-apart seats, and wherein each clamp of the plurality of clamps is independently attachable and removable with respect to each of the other clamps of the plurality of clamps so that each plate assembly of the plurality of plate assemblies is detachably mounted independently from each of the other plate assemblies of the plurality of plate assemblies.

6. The modular heat exchanger of claim 1 further comprising a second galvanic-corrosion-free joint that joins the input manifold and the frame to one another.

7. The modular heat exchanger of claim 1, wherein each conduit of the plurality of conduits is fluidically isolated from each other conduit of the plurality of conduits.

8. The modular heat exchanger of claim 1, wherein the galvanic-corrosion-free joint that joins each inlet distributor of the plurality of inlet distributors to the respective plate assembly of the plurality of plate assemblies comprises a friction-stir-weld joint.

\* \* \* \* \*